US010744459B2

(12) United States Patent
Hoke

(10) Patent No.: US 10,744,459 B2
(45) Date of Patent: Aug. 18, 2020

(54) ZONED CONFIGURATION FOR OXIDATION CATALYST COMBINATIONS

(71) Applicant: BASF CORPORATION, Florham Park, NJ (US)

(72) Inventor: Jeffrey B. Hoke, North Brunswick, NJ (US)

(73) Assignee: BASF Corporation, Florham Park, NJ (US)

(*) Notice: Subject to any disclaimer, the term of this patent is extended or adjusted under 35 U.S.C. 154(b) by 0 days.

(21) Appl. No.: 16/170,406

(22) Filed: Oct. 25, 2018

(65) Prior Publication Data

US 2019/0060833 A1 Feb. 28, 2019

Related U.S. Application Data

(63) Continuation of application No. PCT/IB2017/052380, filed on Apr. 25, 2017.

(60) Provisional application No. 62/327,640, filed on Apr. 26, 2016.

(51) Int. Cl.

| B01D 53/94 | (2006.01) |
|---|---|
| B01J 35/00 | (2006.01) |
| B01J 23/63 | (2006.01) |
| B01J 29/76 | (2006.01) |
| F01N 3/08 | (2006.01) |
| F01N 3/10 | (2006.01) |
| F01N 3/20 | (2006.01) |
| F01N 3/035 | (2006.01) |
| F01N 13/00 | (2010.01) |
| B01J 23/44 | (2006.01) |
| B01J 35/04 | (2006.01) |
| B01J 37/02 | (2006.01) |
| F01N 3/28 | (2006.01) |

(52) U.S. Cl.
CPC ....... *B01D 53/9477* (2013.01); *B01D 53/944* (2013.01); *B01D 53/9418* (2013.01); *B01J 23/44* (2013.01); *B01J 23/63* (2013.01); *B01J 29/763* (2013.01); *B01J 35/0006* (2013.01); *B01J 35/04* (2013.01); *B01J 37/0201* (2013.01); *B01J 37/0215* (2013.01); *F01N 3/035* (2013.01); *F01N 3/0835* (2013.01); *F01N 3/0842* (2013.01); *F01N 3/103* (2013.01); *F01N 3/2066* (2013.01); *F01N 3/2828* (2013.01); *F01N 13/009* (2014.06); *F01N 13/0093* (2014.06); *B01D 2255/1021* (2013.01); *B01D 2255/1023* (2013.01); *B01D 2255/2065* (2013.01); *B01D 2255/2073* (2013.01); *B01D 2255/2092* (2013.01); *B01D 2255/20761* (2013.01); *B01D 2255/40* (2013.01); *B01D 2255/502* (2013.01); *B01D 2255/908* (2013.01); *B01D 2255/9032* (2013.01); *B01D 2255/9155* (2013.01); *F01N 2330/06* (2013.01); *F01N 2370/04* (2013.01); *F01N 2570/12* (2013.01); *F01N 2570/14* (2013.01); *Y02T 10/24* (2013.01)

(58) Field of Classification Search
None
See application file for complete search history.

(56) References Cited

U.S. PATENT DOCUMENTS

| 4,961,917 A | 10/1990 | Byrne | |
|---|---|---|---|
| 5,516,497 A | 5/1996 | Speronello et al. | |
| 6,171,556 B1 | 1/2001 | Burk et al. | |
| 6,683,021 B2* | 1/2004 | Cremona | B01D 53/8668 502/303 |
| 7,229,597 B2* | 6/2007 | Patchett | B01D 5/0054 422/177 |
| 8,715,618 B2 | 5/2014 | Trukhan et al. | |
| 9,138,732 B2 | 9/2015 | Bull et al. | |
| 2003/0124037 A1* | 7/2003 | Voss | B01D 53/864 422/177 |
| 2005/0031514 A1 | 2/2005 | Patchett et al. | |
| 2005/0129601 A1 | 6/2005 | Li et al. | |
| 2007/0269353 A1 | 11/2007 | Li et al. | |
| 2010/0183490 A1* | 7/2010 | Hoke | B01D 53/945 423/213.5 |
| 2013/0078173 A1 | 3/2013 | Cox et al. | |
| 2013/0084222 A1* | 4/2013 | Grubert | B01J 29/04 422/170 |
| 2013/0149223 A1 | 6/2013 | Blakeman et al. | |
| 2013/0266497 A1* | 10/2013 | Seyler | B01D 53/9413 423/213.2 |

(Continued)

FOREIGN PATENT DOCUMENTS

| CN | 102172527 | * | 1/2011 |
|---|---|---|---|
| DE | 102011086787 A1 | | 5/2012 |

(Continued)

*Primary Examiner* — Sheng H Davis
(74) *Attorney, Agent, or Firm* — Womble Bond Dickinson (US) LLP

(57) ABSTRACT

The present disclosure generally provides an emission treatment system for at least partial conversion of gaseous CO emissions. The exhaust gas treatment system includes various components such as a first catalyst component selected from a LNT or an oxidation catalyst for the abatement of HC and CO, which contains a catalyst composition such as a platinum group metal component impregnated into a refractory oxide material. Another component in the exhaust gas treatment system is an SCR catalyst for the abatement of NOx, which contains a catalyst composition such as a metal ion-exchanged molecular sieve and can be optionally absent when the first catalyst component is an LNT. A second oxidation catalyst for further abatement of CO is also part of the emission treatment system and includes a third catalyst composition selected from a platinum group metal component, a base metal oxide component, or combinations thereof disposed onto a carrier substrate.

19 Claims, 4 Drawing Sheets

(56) References Cited

U.S. PATENT DOCUMENTS

| | | | |
|---|---|---|---|
| 2013/0323145 A1 | 12/2013 | Tran et al. | |
| 2014/0093442 A1 | 4/2014 | Spreitzer et al. | |
| 2014/0154160 A1* | 6/2014 | Fisher | B01D 53/94 423/213.5 |
| 2014/0248200 A1 | 9/2014 | Wan et al. | |
| 2015/0139874 A1 | 5/2015 | Zheng et al. | |
| 2016/0003118 A1* | 1/2016 | Ito | B01J 37/038 60/274 |

FOREIGN PATENT DOCUMENTS

| | | | |
|---|---|---|---|
| DE | 102012204524 A1 | | 10/2012 |
| EP | 2335811 A1 | | 6/2011 |
| EP | 2636447 A1 | | 9/2013 |
| KR | 20020061324 | * | 7/2002 |
| WO | 0112320 | * | 2/2001 |
| WO | WO20120175948 | | 12/2012 |
| WO | 2014141903 | * | 9/2014 |

* cited by examiner

ZONED CONFIGURATION FOR OXIDATION CATALYST COMBINATIONS

CROSS-REFERENCE TO RELATED APPLICATIONS

This application is a continuation of International App. No. PCT/IB2017/052380, filed Apr. 25, 2017, which International Application was published by the International Bureau in English on Nov. 2, 2017, and claims priority to U.S. Provisional Application No. 62/327,640, filed Apr. 26, 2016, each of which is incorporated by reference in their entirety and for all purposes.

FIELD OF THE INVENTION

The present invention relates generally to the field of oxidation catalysts and their use in in emission gas treatment systems to reduce carbon monoxide and hydrocarbons.

BACKGROUND OF THE INVENTION

Operations of lean burn engines, for example diesel engines, provide the user with excellent fuel economy due to their operation at high air/fuel ratios under fuel lean conditions. However, diesel engines also emit exhaust gas emissions containing particulate matter (PM), unburned hydrocarbons (HC), carbon monoxide (CO), and nitrogen oxides (NOx), wherein NOx describes various chemical species of nitrogen oxides, including nitrogen monoxide and nitrogen dioxide, among others.

Oxidation catalysts comprising precious metals, such as gold, platinum, palladium, rhodium, iridium, ruthenium and osmium, dispersed on a refractory metal oxide support are known for use in treating the exhaust of diesel engines in order to convert both hydrocarbon (HC) and carbon monoxide (CO) gaseous pollutants by catalyzing the oxidation of these pollutants to carbon dioxide and water. Such catalysts may be contained in diesel oxidation catalysts (DOC), which are placed in the exhaust flow path from a diesel powered engine to treat the exhaust gas stream. Typically, the diesel oxidation catalysts are prepared on ceramic or metallic carrier substrates upon which one or more catalyst coating compositions are deposited. In addition to the conversion of gaseous HC, CO and the soluble organic fraction of particulate matter, oxidation catalysts containing precious metals dispersed on a refractory oxide support may promote the oxidation of nitric oxide to nitrogen dioxide.

As is well-known in the art, catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, it is known in the art to include an adsorbent material, which may be a zeolite, as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature.

As mentioned, oxidation catalysts comprising a precious metal dispersed on a refractory metal oxide support are known for use in treating exhaust gas emissions from diesel engines. Platinum (Pt) remains the primary platinum group metal for oxidizing CO and HC in a DOC, after high temperature aging under lean conditions. One of the major advantages of using palladium (Pd) based catalysts is the lower cost of palladium compared to platinum. However, while addition of palladium to platinum based DOCs does inhibit sintering of platinum and improve CO and HC oxidation performance after high temperature aging, having too much palladium may decrease the activity of platinum to convert paraffins and/or oxidize nitric oxide, especially when used with HC storage materials, and may also make the catalyst more susceptible to sulfur poisoning. These characteristics have typically prevented the replacement of Pt by Pd as an oxidation catalyst in lean burn operations especially for light duty diesel applications, where engine temperatures remain below 250° C. for most driving conditions.

In addition, current diesel engines utilizing new advanced combustion technologies such as Homogeneous Charge Compression Ignition (HCCI) are able to reduce engine output of $NO_x$ and particulate matter (PM) emissions by reducing the combustion flame temperature within the engine cylinder and by increasing the uniformity and mixing of the fuel charge prior to ignition. However, in the process of changing the combustion process to lower $NO_x$ and PM emissions, the overall quantity of CO and HC emissions can increase, the nature of the HCs formed can change, and the exhaust temperature may be lowered. In some instances, the CO and HC emissions from advanced combustion diesel engines is 50% to about 100% higher than the HC and CO emissions from traditional diesel engines. Furthermore, as vehicle manufacturers seek to meet long term worldwide fuel economy standards, the engine exhaust temperature is expected to decline significantly, thereby challenging the DOC to function at lower and lower temperature to oxidize CO, HC and NOx. DOC catalysts with lower light-off for CO and HC will be required.

These observations, in conjunction with emissions regulations becoming more stringent, has driven the need for developing emission gas treatment systems with improved CO and HC oxidation capacity to manage CO and HC emissions at low engine exhaust temperatures.

SUMMARY OF THE INVENTION

The present invention provides an emission treatment system for at least partial conversion of gaseous CO and HC emissions. The emission gas treatment system comprises one or more components for the treatment of exhaust gas emissions such as a first diesel oxidation catalyst (DOC), a second diesel oxidation catalyst (herein referred to as CO oxidation catalyst), and/or a selective catalytic reduction (SCR) catalyst but may also include any additional components such as a soot filter component, an LNT component and/or additional oxidation catalyst, although the relative placement of the various components of the emission treatment system can be varied. The CO oxidation catalyst component is preferably located where the concentration of NO and high molecular weight HCs is low in the emission treatment system because this particular oxidation catalyst is more efficient in removing CO and HCs from an already treated exhaust gas stream compared to removing CO and HCs from an untreated exhaust gas stream, where the concentration of NO and high molecular weight HCs is high. In particular, the light-off temperature for the CO oxidation catalyst is significantly lower, when being exposed to an already treated exhaust gas stream, and therefore demonstrates increased efficiency for residual CO and HC oxidation compared to the oxidation performance of the same CO oxidation catalyst when exposed to an untreated exhaust gas stream.

Therefore, one aspect of the invention describes an exhaust gas treatment system comprising:
  a first catalyst component selected from an LNT for the abatement of HC, CO and NOx or a first oxidation catalyst component for the abatement of HC and CO, wherein said first oxidation catalyst comprises a first catalyst composition disposed onto a carrier substrate, wherein said first catalyst composition comprises a platinum group metal component impregnated into a refractory oxide material;
  a SCR component for the abatement of NOx, wherein said SCR component comprises a second catalyst composition disposed onto a carrier substrate, wherein said second catalyst composition comprises a metal ion-exchanged molecular sieve; the SCR component being optionally absent when the first catalyst component is an LNT;
  a second oxidation catalyst component for the abatement of CO, wherein said second oxidation catalyst component comprises a third catalyst composition disposed onto a carrier substrate, wherein said third catalyst composition is selected from a platinum group metal component, a base metal oxide component, or a combination thereof; and
    wherein the first catalyst component is located downstream of an internal combustion engine, wherein the SCR component if present is located downstream of the first catalyst component, and wherein the second oxidation catalyst component is located downstream of the SCR component if present.

In some embodiments the first catalyst component is the first oxidation catalyst. In other embodiments, the first catalyst component is the LNT.

In some embodiments, the third catalyst composition comprises a platinum group metal component impregnated into an oxygen storage component. In some embodiments, the platinum group metal component is platinum, palladium or combinations thereof. In some embodiments, the oxygen storage component is ceria.

In other embodiments, the third catalyst composition is a base metal oxide component comprising MnOx, CuO, or a combination thereof. In some embodiments, the base metal oxide component comprises a combination of MnOx and CuO in a weight ratio of about 1:10 to about 10:1. In some embodiments, the base metal oxide component further comprises a base metal oxide selected from Group VIII, Group IIIB, rare earth metals, Group IVB, Group VIB, Group IB, Group IIB, or a combination thereof. In some embodiments, the base metal oxide component is impregnated into a refractory oxide support.

In some embodiments, the exhaust gas treatment system further comprises a CSF component, wherein the CSF component comprises a catalyst composition disposed onto a carrier substrate, and wherein said catalyst composition comprises a platinum group metal component impregnated into either a refractory oxide material or an oxygen storage component.

In some embodiments, the CSF component is located downstream of the internal combustion engine and upstream of the second oxidation catalyst component. In some embodiments, the platinum group metal component is palladium, platinum or a combination thereof. In some embodiments, the refractory oxide material is alumina.

In some embodiments, the exhaust gas treatment system further comprises a third oxidation catalyst component, wherein said third oxidation catalyst component comprises a fourth catalyst composition disposed onto a carrier substrate, wherein said fourth catalyst composition comprises a platinum group metal component impregnated into a refractory oxide material, and wherein said third oxidation catalyst component is located upstream of and adjacent to the second oxidation catalyst component. In some embodiments, the platinum group metal component present in the first and/or fourth catalyst composition is a combination of palladium and platinum. In some embodiments, the platinum and palladium are present in a weight ratio of about 10:1 to about 1:1. In some embodiments, the total platinum group metal loading of the first and/or fourth catalyst composition onto the first carrier substrate is at least about 90 g/ft$^3$. In some embodiments, the refractory oxide material of the first and/or fourth catalyst composition is alumina.

In some embodiments, the exhaust gas treatment system comprises a bottom catalytic coating disposed on the carrier substrate and a top catalytic coating comprising the first catalyst composition disposed on the bottom coating. In some embodiments, the bottom catalytic coating comprises platinum and palladium impregnated into alumina. In some embodiments, the top catalytic coating comprises platinum and palladium impregnated into alumina and zeolite. In some embodiments, the metal ion-exchanged molecular sieve comprises a promoter metal and at least one additional metal. In some embodiments, the promoter metal is copper or iron. In some embodiments, the molecular sieve has a CHA structure type. In some embodiments, the CHA crystal structure is an aluminosilicate zeolite.

In some embodiments, one or more carrier substrate is a honeycomb. In some embodiments, the honeycomb comprises a wall flow filter substrate. In some embodiments, at least two catalyst compositions are disposed onto the substrate in a zoned configuration. In some embodiments, the third catalyst composition and the fourth catalyst composition are disposed onto the substrate, wherein said substrate is a honeycomb.

In some embodiments, the internal combustion engine is a diesel engine.

Another aspect of the invention describes a method for reducing carbon monoxide present in an exhaust gas stream comprising:
  a. treating exhaust gas exiting internal combustion engine with a first catalyst component and an SCR catalyst, wherein the first catalyst component is selected from a LNT or a first oxidation catalyst, and wherein the SCR catalyst is positioned downstream of the first catalyst component and can be optionally absent when the first catalyst component is an LNT; thereby forming a treated exhaust gas stream with reduced CO, HC and NOx content compared to exhaust stream exiting internal combustion engine; and
  b. treating the treated exhaust gas stream with a second oxidation catalyst component, where CO, HC, and NOx are more reduced compared to treatment with the first catalyst component alone.

In some embodiments, the method further comprises a third oxidation catalyst, wherein the third oxidation catalyst comprises a platinum group metal component impregnated into a refractory oxide support material, and wherein the third oxidation catalyst is located upstream and adjacent to the second oxidation catalyst component, treating the treated exhaust gas stream exiting the first oxidation catalyst to further oxidize CO and HC present in the treated exhaust gas stream, thereby forming a treated exhaust gas stream with a reduced CO, HC and NOx content compared to the treated exhaust gas stream exiting the first oxidation catalyst.

The invention includes, without limitation, the following embodiments.

Embodiment 1: An exhaust gas treatment system comprising: a first catalyst component selected from a lean NOx trap (LNT) for the abatement of CO, HC and NOx or a first oxidation catalyst component for the abatement of HC and CO, wherein said first oxidation catalyst comprises a first catalyst composition disposed onto a carrier substrate, wherein said first catalyst composition comprises a platinum group metal component impregnated into a refractory oxide material; a selective catalytic reduction (SCR) component for the abatement of NOx, wherein said SCR component comprises a second catalyst composition disposed onto a carrier substrate, wherein said second catalyst composition comprises a metal ion-exchanged molecular sieve; the SCR component being optionally absent when the first catalyst component is an LNT; a second oxidation catalyst component for the abatement of CO, wherein said second oxidation catalyst component comprises a third catalyst composition disposed onto a carrier substrate, wherein said third catalyst composition is selected from a platinum group metal component, a base metal oxide component, or a combination thereof; and wherein the first catalyst component is located downstream of an internal combustion engine, wherein the SCR component if present is located downstream of the first catalyst component, and wherein the second oxidation catalyst component is located downstream of the SCR component if present.

Embodiment 2: The exhaust gas treatment system of any preceding or subsequent embodiment, wherein the third catalyst composition comprises a platinum group metal component impregnated into an oxygen storage component.

Embodiment 3: The exhaust gas treatment system of any preceding or subsequent embodiment, wherein the platinum group metal component is palladium and the oxygen storage component is ceria.

Embodiment 4: The exhaust gas treatment system of any preceding or subsequent embodiment, wherein the third catalyst composition is a base metal oxide component comprising a combination of MnOx and CuO in a weight ratio of about 1:10 to about 10:1.

Embodiment 5: The exhaust gas treatment system of any preceding or subsequent embodiment, wherein the base metal oxide component further comprises a base metal oxide selected from Group VIII, Group IIIB, rare earths metal, Group IVB, Group VIB, Group IB, Group IIB, or a combination thereof.

Embodiment 6: The exhaust gas treatment system of any preceding or subsequent embodiment, wherein the base metal oxide component is impregnated into a refractory oxide support.

Embodiment 7: The exhaust gas treatment system of any preceding or subsequent embodiment, further comprising a catalyzed soot filter (CSF) component, wherein the CSF component comprises a catalyst composition disposed onto a carrier substrate, wherein said catalyst composition comprises a platinum group metal component impregnated into either a refractory oxide material or an oxygen storage component, and wherein said CSF component is located downstream of the internal combustion engine and upstream of the second oxidation catalyst component.

Embodiment 8: The exhaust gas treatment system of any preceding or subsequent embodiment, wherein the platinum group metal component is palladium, platinum or a combination thereof and the refractory oxide material is alumina.

Embodiment 9: The exhaust gas treatment system of any preceding or subsequent embodiment, further comprising a third oxidation catalyst component, wherein said third oxidation catalyst component comprises a fourth catalyst composition disposed onto a carrier substrate, wherein said fourth catalyst composition comprises a platinum group metal component impregnated into a refractory oxide material, and wherein said third oxidation catalyst component is located upstream of and adjacent to the second oxidation catalyst component.

Embodiment 10: The exhaust gas treatment system of any preceding or subsequent embodiment, wherein the platinum group metal component present in the first and/or fourth catalyst composition is a combination of palladium and platinum in a weight ratio of about 10:1 to about 1:1 with a total platinum group metal loading of at least about 90 g/ft$^3$.

Embodiment 11: The exhaust gas treatment system of any preceding or subsequent embodiment, wherein the refractory oxide material of the first and/or fourth catalyst composition is alumina.

Embodiment 12: The exhaust gas treatment system of any preceding or subsequent embodiment, wherein the first catalyst component comprises a bottom catalytic coating disposed on the carrier substrate and a top catalytic coating comprising the first catalyst composition disposed on the bottom coating.

Embodiment 13: The exhaust gas treatment system of any preceding or subsequent embodiment, wherein the bottom catalytic coating comprises platinum and palladium impregnated into alumina and the top catalytic coating comprises platinum and palladium impregnated into alumina and zeolite.

Embodiment 14: The exhaust gas treatment system of any preceding or subsequent embodiment, wherein the metal ion-exchanged molecular sieve comprises copper or iron as a promoter metal and at least one additional metal.

Embodiment 15: The exhaust gas treatment system of any preceding or subsequent embodiment, wherein said molecular sieve is an aluminosilicate zeolite with a CHA structure type.

Embodiment 16: The exhaust gas treatment system of any preceding or subsequent embodiment, wherein one or more of the carrier substrates is a honeycomb substrate.

Embodiment 17: The exhaust gas treatment system of any preceding or subsequent embodiment, wherein the honeycomb substrate is a wall flow filter substrate.

Embodiment 18: The exhaust gas treatment system of any preceding or subsequent embodiment, wherein the internal combustion engine is a diesel engine.

Embodiment 19: A method for reducing carbon monoxide present in an exhaust gas stream comprising: treating exhaust gas exiting internal combustion engine with a first catalyst component and a selective catalytic reduction (SCR) catalyst, wherein the first catalyst component is selected from a lean NOx trap (LNT) or a first oxidation catalyst, and wherein the SCR catalyst is positioned downstream of the first catalyst component and can be optionally absent when the first catalyst component is an LNT; thereby forming a treated exhaust gas stream with reduced CO, HC and NOx content compared to exhaust stream exiting internal combustion engine; and treating the treated exhaust gas stream with a second oxidation catalyst component, where CO, HC, and NOx are more reduced compared to treatment with the first catalyst component alone.

Embodiment 20: The method of any preceding or subsequent embodiment, wherein the first oxidation catalyst comprises a platinum group metal component impregnated into a refractory oxide material.

Embodiment 21: The method of any preceding or subsequent embodiment, wherein the platinum group metal component is a combination of palladium and platinum present in a weight ratio of about 10:1 to about 1:1 and the refractory oxide material is alumina.

Embodiment 22: The method of any preceding or subsequent embodiment, wherein the SCR catalyst comprises a metal ion-exchanged molecular sieve comprising copper or iron and has a CHA structure type.

Embodiment 23: The method of any preceding or subsequent embodiment, wherein the second oxidation catalyst comprises a platinum group metal component impregnated into an oxygen storage component.

Embodiment 24: The method of any preceding or subsequent embodiment, wherein the platinum group metal component is palladium and the oxygen component is ceria.

Embodiment 25: The method of any preceding or subsequent embodiment, further comprising treating the treated exhaust gas stream with a third oxidation catalyst to further oxidize CO and HC present in the treated exhaust gas stream, thereby forming a treated exhaust gas stream with a reduced CO, HC and NOx content compared to the treated exhaust gas stream exiting the first oxidation catalyst, wherein the third oxidation catalyst comprises a platinum group metal component impregnated into a refractory oxide support material, and wherein the third oxidation catalyst is located upstream and adjacent to the second oxidation catalyst component.

Embodiment 26: The method of any preceding or subsequent embodiment, wherein the platinum group metal component is a combination of palladium and platinum present in a weight ratio of about 10:1 to about 1:1 and wherein the refractory oxide support is alumina.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE PREFERRED EMBODIMENTS

Figure 1:
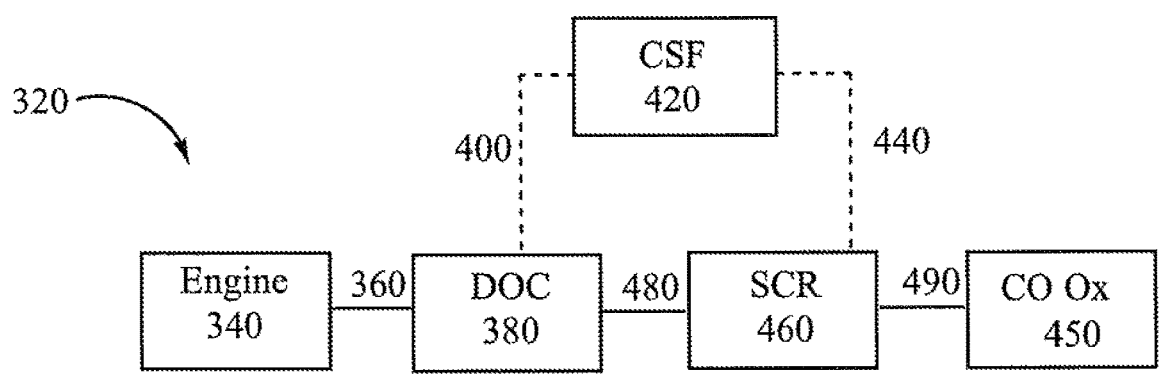
FIG. 1 shows a schematic depiction of an embodiment of an emission treatment system in which a DOC and a CO oxidation catalyst component of the present invention is utilized.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present invention provides an emission treatment system for at least partial conversion of gaseous CO and HC emissions. In some embodiments, the emission gas treatment system of the present invention comprises one or more components for the treatment of exhaust gas emissions such as a diesel oxidation catalyst (DOC), a CO oxidation catalyst, and/or a selective catalytic reduction (SCR) catalyst but may also include any additional components such as a soot filter component, a lean NOx trap component (LNT), and/or an additional oxidation catalyst, although the relative placement of the various components of the emission treatment system can be varied. The CO oxidation catalyst component is preferably located where the concentration of NO and high molecular weight HCs is low in the emission treatment system. For example, the CO oxidation catalyst component is located downstream of other components present in the emission treatment system, which have treated the exhaust gas already prior to exposure of it to the CO oxidation catalyst component. In some embodiments, the CO oxidation catalyst is located downstream of a DOC, which oxidizes CO and HC present in the exhaust gas stream, and/or an SCR component, which reduces NOx present in the exhaust gas stream component. In other embodiments, the CO oxidation catalyst is located downstream of a LNT component and optionally an SCR component, which reduce NOx present in the exhaust gas stream. The CO oxidation catalyst is more efficient in removing any remaining CO and HC present in the already treated exhaust gas stream compared to removing CO and HC in an untreated exhaust gas stream, where the concentration of NO and high molecular weight HCs is high. In particular, the light-off temperature for the CO oxidation catalyst is significantly lower when being exposed to an already treated exhaust gas stream, and therefore demonstrates increased efficiency for CO and HC oxidation compared to the oxidation performance of the CO oxidation catalyst when exposed to an untreated exhaust gas stream. In some embodiments, an additional DOC component is located immediately upstream of the CO oxidation catalyst component within the emission treatment system and provides additional HC removal from the exhaust gas stream prior to exposure to the CO oxidation catalyst. In some embodiments, the exhaust gas treatment system comprises a first, a third and/or forth catalyst composition each comprising a platinum group metal component impregnated into a refractory oxide material. For example, in some embodiments the refractory oxide material of at least two catalyst compositions selected from the first, third and/or forth catalyst composition are the same material impregnated with a PGM component different for each catalyst composition. In some embodiments, the PGM component of the first, third and/or fourth catalyst composition is different because of the PGM selected or PGM combination present, weight ratio of PGM, and PGM component loading onto the refractory oxide material. In some embodiments, at least two PGM components of the first, third and/or forth catalyst composition are the same and impregnated into a refractory oxide material, which may be the same or different for at least two catalyst compositions present in the exhaust gas treatment system.

The following terms shall have, for the purposes of this application, the respective meanings set forth below.

As used herein, the term "selective catalytic reduction" (SCR) refers to the catalytic process of reducing oxides of nitrogen to dinitrogen ($N_2$) using a nitrogenous reductant (e.g., ammonia, urea, and the like).

As used herein, the term "catalyst" or "catalyst composition" refers to a material that promotes a reaction.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, oxides of sulfur, combustible and/or carbonaceous particulate matter (soot), and un-reacted oxygen and nitrogen.

As used herein, the term "substrate" refers to the monolithic material onto which the catalyst composition is placed, typically in the form of a washcoat containing a plurality of particles containing a catalytic composition thereon. A washcoat is formed by preparing slurry containing a certain solid content (e.g., 15-60% by weight) of particles in a liquid vehicle, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

As used herein, the term "catalytic article" refers to an element that is used to promote a desired reaction. For example, a catalytic article may comprise a washcoat containing catalytic compositions on a substrate.

The term "adjacent" means to be immediately right next to a composition, i.e., catalyst, without a gap or other intervening composition.

The term "abatement" means a decrease in the amount, caused by any means.

As used herein, "impregnated" or "impregnation" refers to permeation of the catalytic material into the porous structure of the support material.

As used therein, the term "pseudo crystalline" refers to a substance that appears to be crystalline, even under a microscope, but does not have a true crystalline diffraction pattern.

As used therein, the term "light-off temperature" refers to the temperature at which catalytic reactions are initiated by the diesel oxidation catalyst.

As used therein, the term "disposed on" means for instance "present on, for example, in the form of a catalytic coating composition comprising a catalyst composition".

Emission Treatment System

The emission gas treatment system of the present invention comprises one or more components for the treatment of exhaust gas emissions from a diesel engine such as a diesel oxidation catalyst (DOC), a CO oxidation catalyst (CO Ox), and/or a selective catalytic reduction (SCR) catalyst. The emission treatment system may also further comprise a soot filter component, a lean NOx trap (LNT) component, and/or additional oxidation catalyst, although the relative placement of the various components of the emission treatment system can be varied.

The diesel oxidation catalyst (DOC) component of the exhaust gas treatment system of the present invention may be located, for example, upstream of the SCR component and/or soot filter. A suitable DOC catalyst component for use in the emission treatment system is able to effectively catalyze the oxidation of CO and HC to carbon dioxide ($CO_2$). Preferably, the oxidation catalyst is capable of converting at least 50% of the CO or HC component present in the exhaust gas.

In addition to treating the exhaust gas emissions via use of an oxidation catalyst the present invention may employ a soot filter for removal of particulate matter. The soot filter may be located upstream or downstream from the DOC, but typically, the soot filter will be located downstream from the DOC. In one embodiment, the soot filter is a catalyzed soot filter (CSF). The CSF may comprise a substrate coated with washcoat particles containing one or more catalysts for burning off trapped soot and or oxidizing exhaust gas stream emissions. In general, the soot burning catalyst can be any known catalyst for combustion of soot. For example, the CSF can be coated with one or more high surface area refractory oxides (e.g., an aluminum oxide or ceria-zirconia) for the combustion of CO and unburned hydrocarbons and to some degree particulate matter. The soot burning catalyst can be an oxidation catalyst comprising one or more precious metal catalysts (e.g., platinum, palladium, and/or rhodium).

The exhaust gas treatment system of the present invention may further comprise a selective catalytic reduction (SCR) component. The SCR component may be located upstream or downstream of the DOC and/or soot filter. Preferably, the SCR component is located downstream of a soot filter component. A suitable SCR catalyst component for use in the emission treatment system is able to effectively catalyze the reduction of the NOx exhaust component at temperatures below 600° C., so that reduced NOx levels can be achieved even under conditions of low load which typically are associated with lower exhaust temperatures. Preferably, the catalyst article is capable of converting at least 50% of the NOx component to $N_2$, depending on the amount of reductant added to the system. Another desirable attribute for the composition is that it possesses the ability to catalyze the reaction of $O_2$ with any excess $NH_3$ to form low levels of NOx and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream catalyzed soot filter.

Suitable SCR catalyst compositions are described, for instance, in U.S. Pat. Nos. 4,961,917 and 5,516,497, which are both hereby incorporated by reference in their entirety. The system may further include a NOx storage and release (NSR) catalytic article. In certain embodiments, one or the other of an SCR or NSR catalytic article is included in the system.

Furthermore, the exhaust gas treatment system of the present invention comprises a CO oxidation catalyst component including an oxygen storage component impregnated with a PGM component, e.g., $Pd/CeO_2$ catalyst. The CO oxidation catalyst component further oxidizes remaining CO and HC present in the exhaust gas, which was previously treated with at least one component selected from a DOC, SCR, and/or CSF. Preferably, the CO oxidation catalyst is capable of converting at least 50% of the remaining CO and HCs present in the treated exhaust gas. More importantly, however, the CO oxidation catalyst should remove enough of the remaining CO and HC to meet the required tailpipe emission standards. In some embodiments, the CO oxidation catalyst component is located where the concentration of NO and high molecular weight HCs is low in the emission treatment system. For example, the CO oxidation catalyst component is located downstream of the DOC, CSF and/or SCR components that remove HC and NOx from the engine exhaust prior to the CO oxidation catalyst component. The CO oxidation catalyst is more efficient in removing any remaining CO and HC present in the already treated exhaust gas stream compared to removing CO and HC in an untreated exhaust gas stream, where the concentration of NO and high molecular weight HCs is high. Therefore, the reduction of HC and NO concentrations present in the exhaust gas by the upstream DOC, CSF, and SCR components allows the downstream CO oxidation catalyst component, e.g., $Pd/CeO_2$ catalyst, to function at higher efficiency. In addition, the light-off temperature of the CO oxidation catalyst being exposed to a treated exhaust gas stream is significantly lower compared to the light-off temperature of a CO oxidation catalyst being exposed to an untreated exhaust gas stream. Further enhancement of the CO oxidation catalyst component activity is also achieved by the inclusion of additional HC and NOx adsorption components upstream of the CO oxidation catalyst component in a separate component or combined with any of the existing DOC, CSF, or SCR components. Although location of the CO oxidation catalyst component downstream of the DOC, CSF, and SCR components may expose the CO oxidation catalyst component to lower temperatures, CO oxidation performance would be enhanced due to a reduction in the local NO and HC concentration. Since CO oxidation is a self-inhibiting reaction that is heavily influenced by the local CO concentration, any reduction of CO by the DOC or CSF components would also enhance the activity of the downstream CO oxidation catalyst component, e.g., $Pd/CeO_2$, catalyst. Although placement of the CO oxidation catalyst component as the last component in the emission treatment system is preferred, location in other positions, where the NO and HC concentrations are low are included within the scope of the invention. In addition, the CO oxidation catalyst component, e.g., $Pd/CeO_2$ catalyst, does not need to be located in a separate component but can be included in the same component, such as the DOC, CSF, or SCR component, wherein the catalytic compositions for such components is applied to the carrier substrate in a zoned configuration.

An exemplified emission treatment system may be more readily appreciated by reference to FIG. 1, which depicts a schematic representation of an emission treatment system 320, in accordance with this embodiment of the present invention. Referring to FIG. 1, an exhaust gas stream containing gaseous pollutants (e.g., unburned hydrocarbons, carbon monoxide and NOx) and particulate matter is conveyed via line 360 from an engine 340 to a diesel oxidation catalyst (DOC) 380, a composition of the present invention. In the DOC 380, unburned gaseous and non-volatile hydrocarbons and carbon monoxide are largely combusted to form carbon dioxide and water. In addition, a proportion of the NO of the NOx component may be oxidized to $NO_2$ in the DOC. The exhaust stream is next conveyed via line 400 to a catalyzed soot filter (CSF) 420 if present, which traps particulate matter present within the exhaust gas stream. The CSF 420 is optionally catalyzed for enhanced regeneration performance. After removal of particulate matter, via CSF 420, the exhaust gas stream is conveyed via line 440 to a downstream selective catalytic reduction (SCR) component 460 for the treatment and/or conversion of NOx. The exhaust stream may also be conveyed via line 480 directly to the selective catalytic reduction (SCR) component 460 if no CSF 420 is present. Alternatively, the SCR catalyst component could be coated onto the CSF, thereby eliminating the need for separate CSF and SCR components.

The selective catalytic reduction (SCR) component 460 of the invention further provides treatment of the exhaust with regards to any $NO_x$ species. The exhaust gas passes through the SCR component 460 at a flow rate which allows sufficient time for the catalyst composition to reduce the level of NOx (in combination with a reductant) in the exhaust gas at a given temperature. The exhaust stream is next conveyed via line 490 to a CO oxidation catalyst 450 of the present invention to further remove any residual CO and HC remaining in the exhaust gas before exiting the system.

Figure 2:
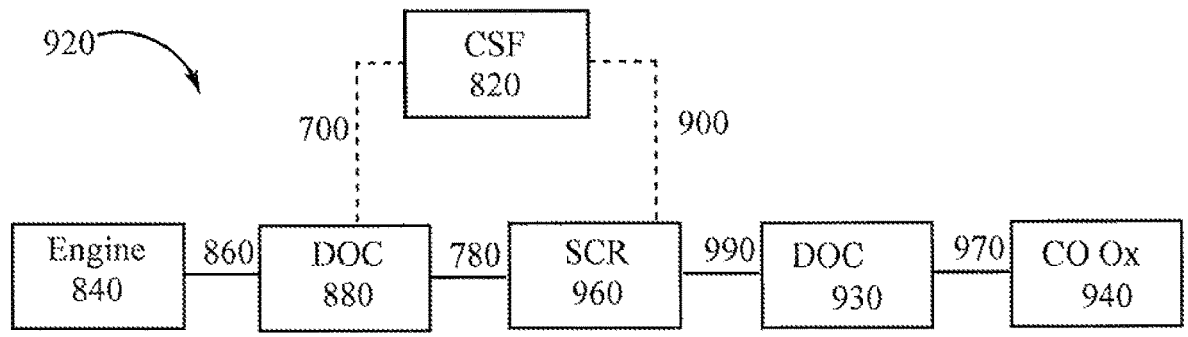
FIG. 2 shows a schematic depiction of an embodiment of an emission treatment system in which two DOCs and a CO oxidation catalyst component of the present invention is utilized, wherein one DOC is immediately upstream of the CO oxidation catalyst component.

Another embodiment of an emission gas treatment system of the invention is shown in FIG. 2, which depicts a schematic representation of an emission treatment system 920 also, in accordance with this embodiment of the present invention. Referring to FIG. 2, an exhaust gas stream containing gaseous pollutants (e.g., unburned hydrocarbons, carbon monoxide and NOx) and particulate matter is conveyed via line 860 from an engine 840 to a diesel oxidation catalyst (DOC) 880, a composition of the present invention. Next, the exhaust stream is conveyed via line 700 to a catalyzed soot filter (CSF) 820 if present, which traps particulate matter present within the exhaust gas stream. The CSF 820 is also optionally catalyzed for enhanced regeneration performance. After removal of particulate matter, via CSF 820, the exhaust gas stream is conveyed via line 900 to a downstream selective catalytic reduction (SCR) component 960 for the treatment and/or conversion of NOx. The exhaust stream may also be conveyed via line 780 to the selective catalytic reduction (SCR) component 960 if no CSF 820 is present. Alternatively, the SCR catalyst component could be coated onto the CSF, thereby eliminating the need for separate CSF and SCR components.

The exhaust gas passes through the SCR component 960 at a flow rate which allows sufficient time for the catalyst composition to reduce the level of NOx (e.g., in combination with a reductant) in the exhaust gas at a given temperature. The exhaust stream is next conveyed via line 990 to a second DOC catalyst 930 of the present invention to further reduce any residual CO and HC present in the exhaust stream 990. Immediately following DOC catalyst component 930 is a CO oxidation catalyst 940 of the present invention to further remove any residual CO and HC present before the exhaust gas exits the treatment system.

The DOC component/CO oxidation catalyst component combination, i.e., 930, 940, described in FIG. 2 was also investigated in Example 3.

Example 3 shows a $T_{50}$ for CO oxidation of about 136° C. or less measured when the DOC component/CO oxidation catalyst component combination was engine aged for 25 hours at 750° C. and tested in a flow reactor system with a typical simulated diesel exhaust feed gas and gas hourly space velocity (GHSV) of 70,000/h. In certain embodiments, the invention provides a DOC component/CO oxidation catalyst component combination characterized by a $T_{50}$ for CO oxidation of about 130° C. or less, about 127° C. or less, or about 125° C. or less, or about 123° C. or less when aged and tested as noted above. In certain embodiments, a DOC component/CO oxidation catalyst component combination can be characterized by a $T_{50}$ for CO oxidation that is about 6° C. lower (e.g., at least about 6° C. lower) than a $T_{50}$ for CO oxidation of a comparative catalyst comprising only the DOC component.

Figure 3:
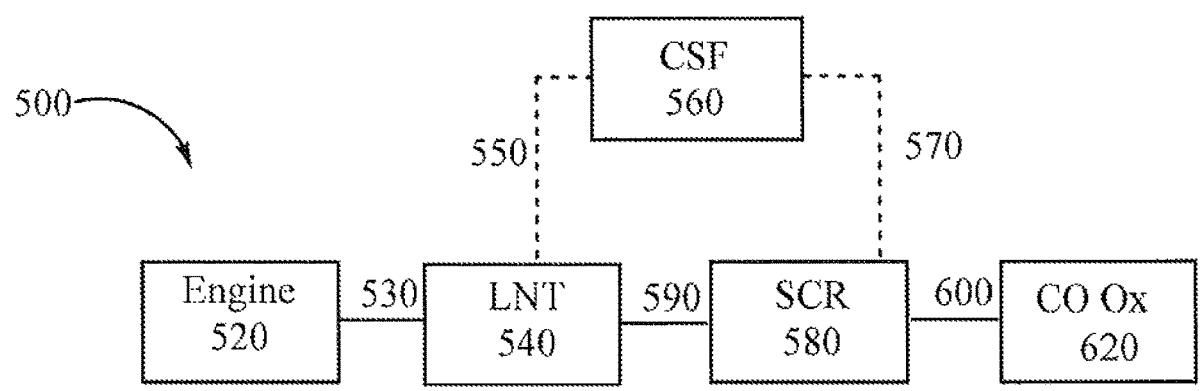
FIG. 3 shows a schematic depiction of an embodiment of an emission treatment system in which a LNT and a SCR component is utilized, wherein the LNT is immediately upstream of the SCR component, which is adjacent to the CO oxidation catalyst component of the present invention.

Another embodiment of an emission gas treatment system of the invention is shown in FIG. 3, which depicts a schematic representation of an emission treatment system 500 also, in accordance with this embodiment of the present invention. Referring to FIG. 3, an exhaust gas stream containing gaseous pollutants (e.g., unburned hydrocarbons, carbon monoxide and NOx) and particulate matter is conveyed via line 530 from an engine 520 to a diesel lean NOx trap (LNT) 540. Next, the exhaust stream is conveyed via line 550 to a catalyzed soot filter (CSF) 560 if present, which traps particulate matter present within the exhaust gas stream. The CSF 560 is also optionally catalyzed for enhanced regeneration performance. After removal of particulate matter, via CSF 560, the exhaust gas stream is conveyed via line 570 to a downstream selective catalytic reduction (SCR) component 580 for the treatment and/or conversion of NOx. The exhaust stream may also be conveyed via line 590 to the selective catalytic reduction (SCR) component 580 if no CSF 560 is present. Alternatively, the SCR catalyst component could be coated onto the CSF, thereby eliminating the need for separate CSF and SCR components Immediately following SCR catalyst component 580 is a CO oxidation catalyst 620 of the present invention to further remove any residual CO and HC present before the exhaust gas exits the treatment system.

Typically, NOx trap (LNT) systems contain alkaline earth elements. For example, NOx sorbent components include alkaline earth metal oxides, such as oxides of Mg, Ca, Sr and Ba. Other lean LNT systems can contain rare earth metal oxides such as oxides of Ce, La, Pr and Nd. The NOx sorbents can be used in combination with platinum group metal catalysts such as platinum dispersed on an alumina support in the purification of exhaust gas from an internal combustion engine.

A conventional LNT typically contains basic sorbent components (e.g., BaO/BaCO$_3$ and/or CeO$_2$) for NOx storage and platinum group metals (PGM, i.e., Pt, Pd and Rh) for catalytic NOx oxidation and reduction. The LNT catalyst operates under cyclic lean (trapping mode) and rich (regeneration mode) exhaust conditions during which the engine out NO is converted to N$_2$ as shown in equations 1-6:

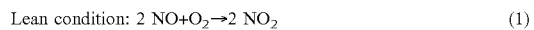

Lean condition: 2 NO+O$_2$→2 NO$_2$ (1)

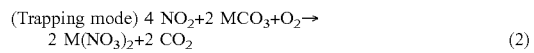

(Trapping mode) 4 NO$_2$+2 MCO$_3$+O$_2$→
2 M(NO$_3$)$_2$+2 CO$_2$ (2)

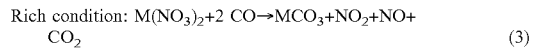

Rich condition: M(NO$_3$)$_2$+2 CO→MCO$_3$+NO$_2$+NO+
CO$_2$ (3)

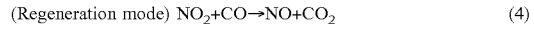

(Regeneration mode) NO$_2$+CO→NO+CO$_2$ (4)

2 NO+2 CO→N$_2$+2 CO$_2$ (5)

2 NO+2 H$_2$→N$_2$+2 H$_2$O (6)

Molecular sieves such as zeolites are typically used in diesel oxidation catalysts (DOC) as well as in Lean NOx Trap (LNT) applications for the purpose of adsorbing hydrocarbons (HC) from the engine exhaust during startup of the vehicle when the catalyst is cold and unable to oxidize the hydrocarbons to CO$_2$ (cold start). When the temperature of the exhaust increases to the point when the platinum group metal in the catalyst becomes active, hydrocarbon is released from the molecular sieve and is subsequently oxidized to CO$_2$. Hence, LNT systems can also be used as oxidation catalysts for oxidizing CO and HC in an exhaust gas treatment system.

Figure 4:
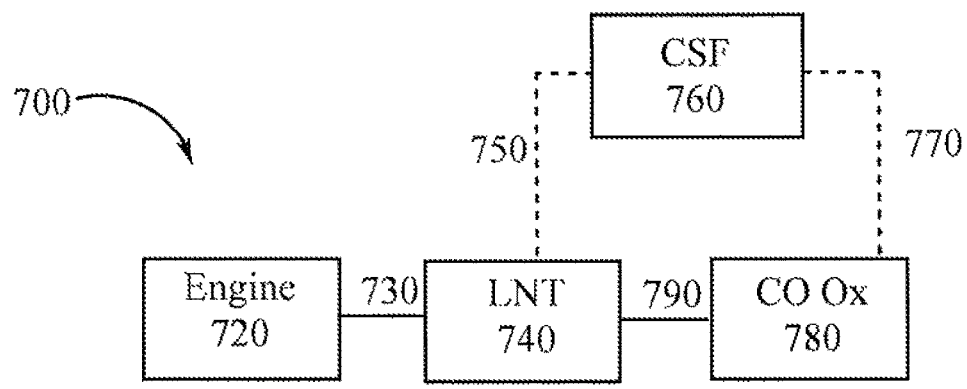
FIG. 4 shows a schematic depiction of an embodiment of an emission treatment system in which a LNT and a CO oxidation catalyst component of the present invention is utilized, wherein the LNT is immediately upstream of the CO oxidation catalyst component.

Yet, another embodiment of an emission gas treatment system of the invention is shown in FIG. 4, which depicts a schematic representation of an emission treatment system 700 also, in accordance with this embodiment of the present invention. Referring to FIG. 4, an exhaust gas stream containing gaseous pollutants as previously described and particulate matter is conveyed via line 730 from an engine 720 to a diesel lean NOx trap (LNT) 740. Next, the exhaust stream is conveyed via line 750 to a catalyzed soot filter (CSF) 760 if present, which traps particulate matter present within the exhaust gas stream. The CSF 760 is also optionally catalyzed for enhanced regeneration performance. After removal of particulate matter, via CSF 760, the exhaust gas stream is conveyed via line 770 to a downstream oxidation catalyst component (CO Ox) 780 of the present invention for the treatment and/or conversion of residual CO and HC present before the exhaust gas exits the treatment system. The exhaust stream may also be conveyed via line 790 to the oxidation catalyst component (CO Ox) 780 if no CSF 760 is present.

Catalyst Composition

The DOC, CO oxidation catalyst and optionally LNT systems include a PGM component impregnated into a porous refractory oxide support or oxygen storage component. As used herein, "platinum group metal" or "PGM" refers to platinum group metals or oxides thereof, including platinum (Pt), palladium (Pd), ruthenium (Ru), rhodium (Rh), osmium (Os), iridium (Ir), and mixtures thereof. In certain embodiments, the PGM component comprises a combination of platinum group metals, e.g., platinum and palladium, such as in a weight ratio of about 1:10 to about 10:1, more typically in a platinum to palladium weight ratio equal to or greater than about 1:1, equal to or greater than about 1.5:1, or equal to or greater than about 2:1. In other embodiments, the PGM component includes platinum or palladium. The concentrations of the PGM component (e.g., Pt, Pd or a combination thereof) can vary, but will typically be from about 0.1 wt. % to about 10 wt. % relative to the weight of the impregnated porous refractory oxide support or the oxygen storage component (e.g., about 1 wt. % to about 6 wt. % relative to the impregnated support material).

In some embodiments, the CO oxidation catalyst comprises a base metal oxide component. Base metal oxides have previously been used in catalyst compositions for the oxidation of CO, HC, and NO in diesel exhaust gas. As used herein, "base metal component" refers to oxides of base metals selected from copper, lead, iron, nickel, zinc, aluminum, tin, tungsten, molybdenum, tantalum, cobalt, bismuth, cadmium, titanium, zirconium, antimony, manganese, beryllium, chromium, germanium, vanadium, gallium, hafnium, indium, niobium, rhenium, thallium, and a combination thereof. In some embodiments, the base metal component comprises metal oxides of manganese (Mn), copper (Cu), or a combination thereof. Mn exhibits several possible oxidation states in its oxide form (e.g., +2, +3, and +4) depending on its environment and is therefore referred to as MnOx, wherein x is representative of the metal's oxidation state. Cu in oxide form generally exhibits an oxidation state of +2 although +1 is also known. In certain embodiments, the base metal oxide component comprises a combination of MnOx and CuO, such as in a weight ratio of about 1:10 to about 10:1.

In some embodiments, the base metal oxide component comprises base metal oxides MnOx and/or CuO combined with oxides of metals selected from Group VIII, Group MB, rare earth metals, Group IVB, Group VB, Group VIB, Group IB, Group IIB, and a combination thereof. In some embodiments, base metal oxides are combined with metal oxides selected from yttrium, lanthanum, cerium, praseodymium, titanium, zirconium, vanadium, niobium, chromium, molybdenum tungsten, and a combination thereof. In some embodiments, the proportions of all the individual metal oxides present in the base metal oxide component can vary. For example, in some embodiments, MnOx and/or CuO are present in the base metal oxide component in an amount of at least about 1% to about 95% by weight of the total metal oxide component.

As used herein, "porous refractory oxide" refers to porous metal-containing oxide materials exhibiting chemical and physical stability at high temperatures, such as the temperatures associated with diesel engine exhaust. Exemplary refractory oxides include alumina, silica, zirconia, titania, ceria, and physical mixtures or chemical combinations thereof, including atomically-doped combinations and including high surface area or activated compounds such as activated alumina. Exemplary aluminas include large pore boehmite, gamma-alumina, and delta/theta alumina. Useful commercial aluminas include activated aluminas, such as high bulk density gamma-alumina, low or medium bulk density large pore gamma-alumina, and low bulk density large pore boehmite and gamma-alumina.

High surface area refractory oxide supports, such as alumina support materials, also referred to as "gamma alumina" or "activated alumina," typically exhibit a BET surface area in excess of 60 m$^2$/g, often up to about 200 m$^2$/g or higher. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by $N_2$ adsorption. Desirably, the active alumina has a specific surface area of 60 to 350 m$^2$/g, and typically 90 to 250 m$^2$/g.

As used therein, "OSC" refers to an oxygen storage component, which is an entity that has multi-valent oxidation states and can actively react with oxidants such as oxygen ($O_2$) or nitric oxides ($NO_2$) under oxidizing conditions, or reacts with reductants such as carbon monoxide (CO), hydrocarbons (HC), or hydrogen ($H_2$) under reducing conditions. Certain exemplary OSCs are rare earth metal oxides, which refers to one or more oxides of scandium, yttrium, and the lanthanum series defined in the Periodic Table of Elements. Examples of suitable oxygen storage components include ceria and praseodymia and combinations thereof.

The SCR component of the invention includes a metal ion-exchanged molecular sieve (e.g., molecular sieve containing a promoter metal). In some embodiments, the metal exchanged molecular sieve is impregnated with at least one additional metal. In certain embodiments, the combination of promoter metal and the additional metal impregnated into the molecular sieve is expressed as a weight ratio of the corresponding metal oxides and ranges from about 1:10 to about 10:1. The concentration of promoter metal present in the metal ion-exchanged molecular sieve can vary, but will typically be from about 0.1 wt. % to about 10 wt. % relative to the weight of the ion-exchanged molecular sieve calculated as metal oxide. Likewise, the concentration of the additional metal present in the modified metal ion-exchanged molecular sieve can vary, but will typically be from about 0.1 wt. % to about 10 wt. % relative to the weight of the ion-exchanged molecular sieve calculated as the metal oxide. In some embodiments, copper or iron is selected as the metal (e.g., promoter metal). In some embodiments, aluminum is selected as the additional metal. In further embodiments, the molecular sieve is a chabazite (CHA) zeolite support.

The promoter metal is intentionally added to the molecular sieves to enhance the catalytic activity of the molecular sieves compared to molecular sieves that do not have a metal intentionally added. Accordingly, the molecular sieve of one or more embodiments may be ion-exchanged with one or more promoter metals such as copper (Cu), cobalt (Co), nickel (Ni), lanthanum (La), manganese (Mn), iron (Fe), vanadium (V), silver (Ag), and cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), and tungsten (W). In specific embodiments, the molecular sieve component is promoted with Cu.

The additional metal can be selected from the group consisting of alkali metals, alkaline earth metals, and transition metals in Groups IIIB, IVB, VB, VIB VIIB, VIIIB, IB, and IIB, Group IIIA elements, Group IVA elements, lanthanides, actinides and a combination thereof. In one embodiment, the additional metal is selected from aluminum, iron, copper, zirconium, and a combination thereof. In some embodiments, the promoter metal and the additional metal are not the same metal.

The molecular sieves of the current invention refer to support materials such as zeolites and other framework materials (e.g. isomorphously substituted materials), which may be in particulate form, and in combination with one or more promoter metals are used as catalysts.

In one or more embodiments, the molecular sieve of the current invention comprises any structure type of zeolite can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In one or more embodiments, the molecular sieves include chabazite (CHA) crystal structure zeolites and are selected from an aluminosilicate zeolite, a borosilicate, a gallosilicate, a SAPO, and ALPO, a MeAPSO, and a MeAPO. In some embodiments, zeolites having the CHA structure are used and include, but are not limited to SSZ-13, SSZ-62, natural chabazite, zeolite K-G, Linde D, Linde R, LZ-218, LZ-235, LZ-236, ZK-14, SAPO-34, SAPO-44, SAPO-47, CuSAPO-34, CuSAPO-44, CuSAPO-47, and ZYT-6.

The particle size of the zeolite can vary. Generally the particle size of CHA zeolite can be characterized by a D90 particle size of about 10 to about 40 microns, preferably about 10 to about 30 microns, more preferably 10 microns to about 20 microns. D90 is defined as the particle size at which 90% of the particles have a finer particle size.

Zeolite support material typically exhibits a BET surface area in excess of 60 $m^2/g$, often up to about 200 $m^2/g$ or higher. "BET surface area" has its usual meaning of referring to the Brunauer, Emmett, Teller method for determining surface area by $N_2$ adsorption. In one or more embodiments the BET surface area is at least about 200 $m^2/g$, or at least about 400 $m^2/g$, or at least about 600 $m^2/g$.

For aluminosilicate molecular sieves, the ratio of silica to alumina of such a molecular sieve can vary over a wide range. In one or more embodiments, the molecular sieve has a silica to alumina molar ratio (SAR) in the range of 2 to 300, including 5 to 250; 5 to 200; 5 to 100; and 5 to 50. In one or more specific embodiments, the molecular sieve has a silica to alumina molar ratio (SAR) in the range of 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

Substrate

According to one or more embodiments, the substrate for the composition of a DOC, SCR, CSF, LNT and CO oxidation catalyst component may be constructed of any material typically used for preparing automotive catalysts and will typically comprise a metal or ceramic honeycomb structure. The substrate typically provides a plurality of wall surfaces upon which the washcoat composition is applied and adhered, thereby acting as a carrier substrate for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-a alumina, silicon nitride, zircon mullite, spodumene, alumina-silica magnesia, zircon silicate, sillimanite, magnesium silicates, zircon, petalite, a alumina, aluminosilicates and the like.

Any suitable substrate design may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used in wall-flow filter substrates. However, it will be understood that the invention is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls.

Figure 5:
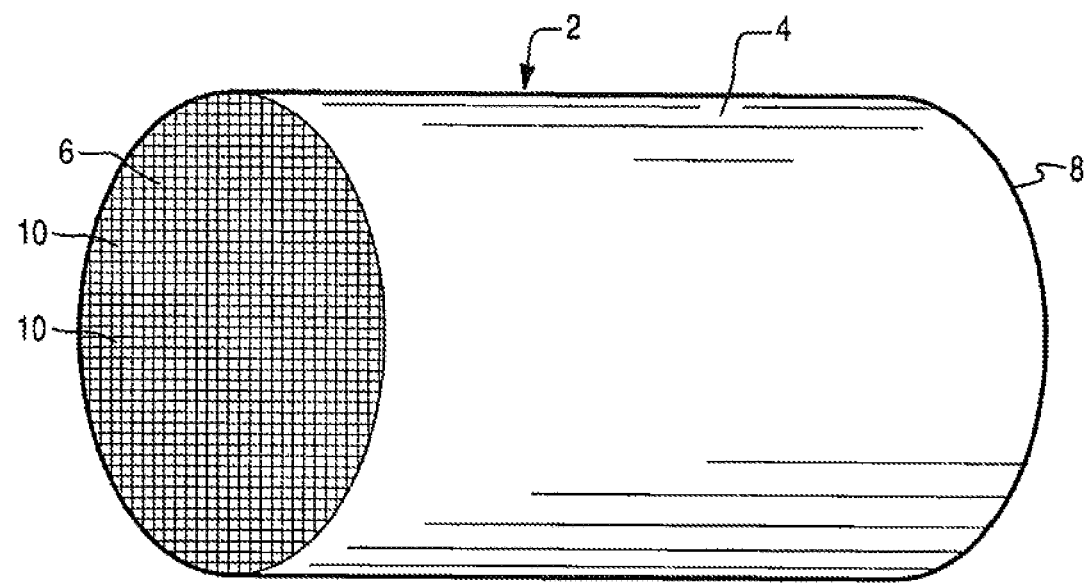
FIG. 5 is a perspective view of a honeycomb-type substrate which may comprise a catalytic composition in can be used in accordance with the present invention.
Figure 6:
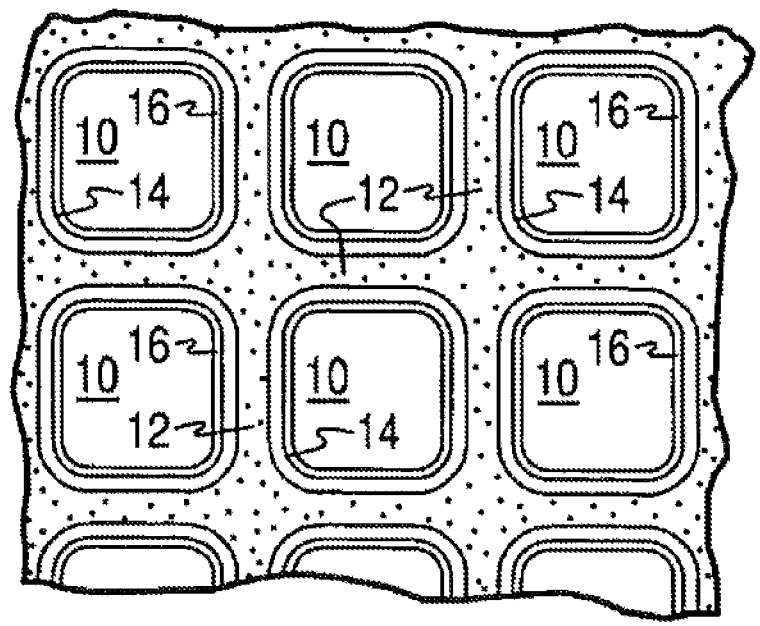
FIG. 6 is a partial cross-sectional view enlarged relative to FIG. 5 and taken along a plane parallel to the end faces of the substrate of FIG. 5 representing a monolithic flow-through substrate, which shows an enlarged view of a plurality of the gas flow passages shown in FIG. 5.

FIGS. 5 and 6 illustrate an exemplary substrate 2 in the form of a flow-through substrate coated with a washcoat composition as described herein. Referring to FIG. 5, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 6, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 6, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the illustrated two-layer embodiment.

Figure 7:
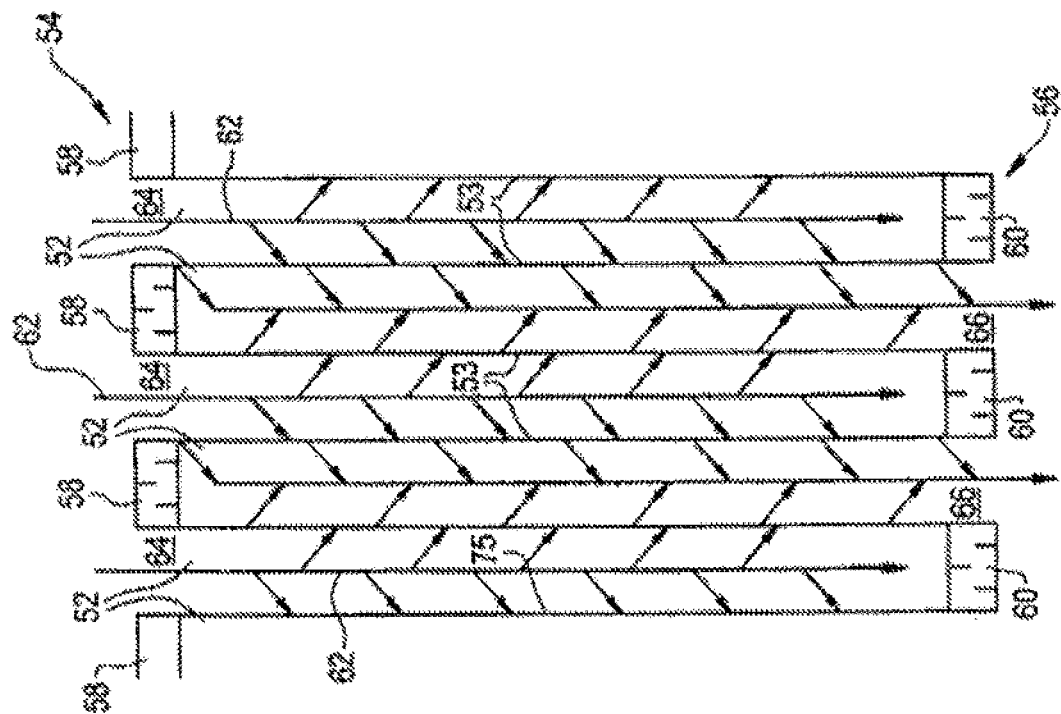
FIG. 7 is a cutaway view of a section enlarged relative to FIG. 5 (and perpendicular to the end faces), wherein the honeycomb-type substrate in FIG. 5 represents a wall flow filter substrate monolith.

Alternatively, FIGS. 5 and 7 can illustrate an exemplary substrate 2 in the form a wall flow filter substrate coated with a washcoat composition as described herein. As seen in FIG. 5, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

Figure 8:
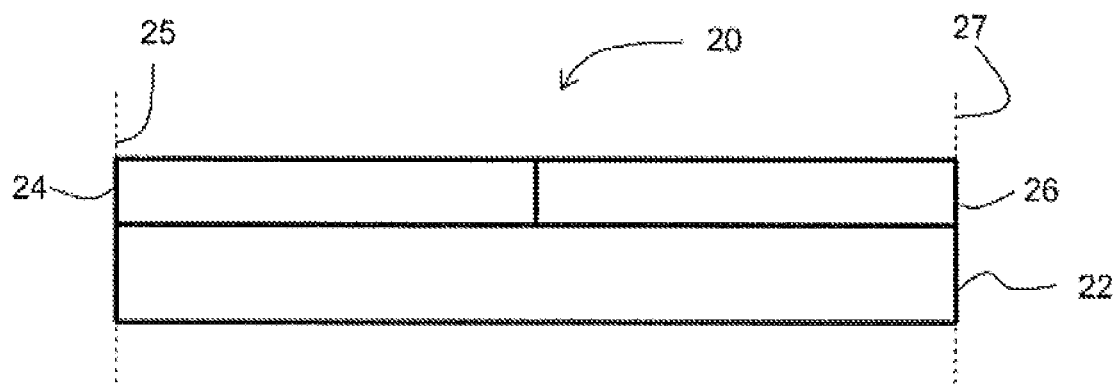
FIG. 8 shows a cross-sectional view of a zoned oxidation catalyst of the present invention.

In some embodiments, the same carrier substrate is coated with at least two catalyst compositions contained in separate washcoat slurries in an axially zoned configuration. For example, the same carrier substrate is coated with washcoat slurry of one catalyst composition and a washcoat slurry of another catalyst composition, wherein each catalyst composition is different. This may be more easily understood by reference to FIG. 8, which shows an embodiment in which the first washcoat zone 24 and the second washcoat zone 26 are located side by side along the length of the carrier substrate 22. The first washcoat zone 24 of specific embodiments extends from the inlet end 25 of the carrier substrate 22 through the range of about 5% to about 95% of the length of the carrier substrate 22. The second washcoat zone 26 extends from the outlet 27 of the carrier substrate 22 from about 5% to about 95% of the total axial length of the carrier substrate 22. The catalyst compositions of at least two components within the treatment system described can be zoned onto the same carrier substrate. In some embodiments, the catalyst composition of DOC and SCR components are zoned onto the same carrier substrate. In other embodiments, the catalyst compositions of DOC and CO oxidation catalyst components are zoned onto the same carrier substrate. In additional embodiments, the same carrier substrate is zoned using three different catalyst compositions.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$") are used herein to mean the weight of a component per volume of the substrate, including the volume of void spaces of the substrate. Other units of weight per volume such as g/L are also sometimes used. The total loading of the catalyst composition on the carrier substrate, such as a monolithic flow-through substrate, is typically from about 0.5 to about 6 g/in$^3$, and more typically from about 1 to about 5 g/in$^3$. Total loading of the PGM component without support material (i.e., the Pt or Pd or combination thereof) is typically in the range of about 10 to about 200 g/ft$^3$ for each individual carrier substrate.

It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating since all of the water of the washcoat slurry has been removed.

Method of Making the Catalyst Composition

Preparation of the PGM-impregnated refractory oxide material or oxygen storage component typically comprises impregnating the refractory oxide support material or oxygen storage component in particulate form with a PGM solution, such as a platinum solution or a palladium solution, or a combination thereof. Multiple PGM components (e.g., platinum and palladium) can be impregnated at the same time or separately, and can be impregnated into the same support particles or separate support particles using an incipient wetness technique.

Incipient wetness impregnation techniques, also called capillary impregnation or dry impregnation are commonly used for the synthesis of heterogeneous materials, i.e., catalysts. Typically, a metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst can then be dried and calcined to drive off the volatile components within the solution, depositing the metal on the catalyst surface. The maximum loading is limited by the solubility of the precursor in the solution. The concentration profile of the impregnated material depends on the mass transfer conditions within the pores during impregnation and drying.

The support particles are typically dry enough to absorb substantially all of the solution to form a moist solid. Aqueous solutions of water soluble compounds or complexes of the PGM component are typically utilized, such as palladium or platinum nitrate, tetraammine palladium or platinum nitrate, or tetraammine palladium or platinum acetate. Following treatment of the support particles with the PGM solution, the particles are dried, such as by heat treating the particles at elevated temperature (e.g., 100-150° C.) for a period of time (e.g., 1-3 hours), and then calcined to convert the PGM components to a more catalytically active form. An exemplary calcination process involves heat treatment in air at a temperature of about 400-550° C. for 1-3 hours. The above process can be repeated as needed to reach the desired level of PGM impregnation. The resulting material can be stored as a dry powder or in slurry form.

Preparation of the metal ion-exchanged molecular sieve typically comprises an ion-exchanged process of the molecular sieve in particulate form with a metal precursor solution. Multiple metal precursors can be ion-exchanged at the same time or separately, can use the same external solution or separate external solutions, and are ion-exchanged on the same support particles.

During the ion exchange process ions with weaker bonding strengths and residing in a porous support, e.g., zeolite, are exchanged with an outside metal ion of interest. For example, zeolites prepared with sodium ions residing in the pores can be exchanged with a different ion to form an ion-exchanged porous support, e.g., zeolite. This is accomplished by preparing a slurry of the porous support, e.g., zeolite, in a solution containing the outside metal ion of interest to be exchanged. Heat may be optionally applied during this process. The outside metal ion can now diffuse into the pores of the support and exchange with the residing ion, i.e., sodium, to form the metal-ion exchanged porous support, e.g., zeolite.

For example, in certain embodiments, metal ion-exchanged molecular sieves have previously been prepared using ion-exchange techniques described in U.S. Pat. No. 9,138,732 to Bull et al and U.S. Pat. No. 8,715,618 to Trukhan et al., which are incorporated by reference therein in their entireties. These ion-exchange processes describe the preparation of a copper ion-exchanged CHA zeolite catalyst. These particles can optionally undergo further ion-exchange with at least one additional metal precursor.

The support particles are usually sufficiently dry to absorb substantially all of the solution to form a moist solid. The metal ion-exchanged molecular sieves are dried at elevated temperature and may also be optionally calcined prior to contact with the additional metal precursor. Aqueous solutions of water soluble compounds or complexes of the metal precursors are typically utilized, such as metal salts (e.g. phosphates, nitrates or acetate salts) of the metal precursors with specific examples including zirconium (IV) hydrogenphosphate, aluminum (III) acetate dibasic, copper (II) acetate, iron (II) acetate, iron (III) acetate and a combination thereof. Colloidal solutions such as water dispersible Disperal® and Dispal® for aluminum based metal precursors may also be used.

The concentration of the metal precursor used to impregnate the metal ion-exchanged molecular sieves may range from about 0.1 wt. % to about 50 wt. % relative to the weight of the metal ion-exchanged molecular sieves.

Following treatment of the support particles, e.g., molecular sieves, with the solution of the metal precursors, the particles are dried, such as by heat treating the particles at elevated temperature (e.g., 100-150° C.) for a period of time (e.g., 1-3 hours), and then calcining to convert the metal components to a more catalytically active oxide form. An exemplary calcination process involves heat treatment in air at a temperature of about 500-800° C. for about 1-3 hours. The above process can be repeated as needed to reach the desired level of metal exchange. The resulting material can be stored as a dry powder or in slurry form.

Substrate Coating Process

The above-noted catalyst composition(s), in the form of carrier particles containing PGM-impregnated refractory oxide material or oxygen storage components or metal ion-exchanged molecular sieves therein, is mixed with water to form a slurry for purposes of coating a catalyst carrier substrate, such as a honeycomb-type substrate.

In addition to the catalyst particles, the slurry may optionally contain alumina as a binder, hydrocarbon (HC) storage components (e.g., zeolite), water-soluble or water-dispersible stabilizers (e.g., barium acetate), promoters (e.g., lanthanum nitrate), associative thickeners, and/or surfactants (including anionic, cationic, non-ionic or amphoteric surfactants). A typical pH range for the slurry is about 3 to about 6.

Optionally, as noted above, the slurry may contain one or more hydrocarbon (HC) storage component for the adsorption of hydrocarbons (HC). Any known hydrocarbon storage material can be used, e.g., a micro-porous material such as a zeolite or zeolite-like material. Preferably, the hydrocarbon storage material is a zeolite. The zeolite can be a natural or synthetic zeolite such as faujasite, chabazite, clinoptilolite, mordenite, silicalite, zeolite X, zeolite Y, ultrastable zeolite Y, ZSM-5 zeolite, offretite, or a beta zeolite. Preferred zeolite adsorbent materials have a high silica to alumina ratio. The zeolites may have a silica/alumina molar ratio of from at least about 25:1, preferably at least about 50:1, with useful ranges of from about 25:1 to 1000:1, 50:1 to 500:1, as well as about 25:1 to 300:1. Preferred zeolites include ZSM, Y and beta zeolites. A particularly preferred adsorbent may comprise a beta zeolite of the type disclosed in U.S. Pat. No. 6,171,556, incorporated herein by reference in its entirety. When present, zeolite or other HC storage components are typically used in an amount of about 0.05 g/in$^3$ to about 1 g/in$^3$.

When present, the alumina binder is typically used in an amount of about 0.05 g/in$^3$ to about 1 g/in$^3$. The alumina binder can be, for example, boehmite, gamma-alumina, or delta/theta alumina.

The slurry can be milled to enhance mixing of the particles and formation of a homogenous material. The milling can be accomplished in a ball mill, continuous mill, or other similar equipment, and the solids content of the slurry may be, e.g., about 20-60 wt. %, more particularly about 20-40 wt. %. In one embodiment, the post-milling slurry is characterized by a D90 particle size of about 10 to about 40 microns, preferably 10 to about 30 microns, more preferably about 10 to about 15 microns. The D90 is defined as the particle size at which 90% of the particles have a finer particle size.

The slurry is then coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period of time (e.g., 1-3 hours) and then calcined by heating, e.g., at 400-600° C., typically for about 10 minutes to about 3 hours. Following drying and calcining, the final washcoat coating layer can be viewed as essentially solvent-free.

If an OSC is present, delivery of such OSC to a washcoat layer can be achieved by the use of, for example, mixed oxides. For example, ceria can be delivered as a mixed oxide of cerium and zirconium, and/or a mixed oxide of cerium, zirconium, and neodymium. For example, praseodymia can be delivered as a mixed oxide of praseodymium and zirconium, and/or a mixed oxide of praseodymium, cerium, lanthanum, yttrium, zirconium, and neodymium.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

The catalyst composition can be applied as a single layer or in multiple layers. In one embodiment, the catalyst is applied in a single layer (e.g., only layer 16 of FIG. 6). In one embodiment, the catalyst composition is applied in multiple layers with each layer having a different composition. For example, the bottom layer (e.g., layer 14 of FIG. 6) can comprise an oxidation catalyst composition of the invention including a PGM component impregnated into a refractory oxide material and the top layer (e.g., layer 16 of FIG. 6) can comprise a catalyst composition of the invention including a PGM component impregnated into a refractory oxide component in admixture with a zeolite material. In another example, the catalyst composition can comprise one single layer including a PGM component impregnated into an oxygen storage component in admixture with alumina. The relative amount of the oxidation catalyst composition in each layer can vary, with an exemplary dual layer coating comprising about 10-90% by weight of the total weight of oxidation catalyst composition including a PGM component in the bottom layer (adjacent to the substrate surface) and about 10-90% by weight of the total weight of the oxidation catalyst composition in the top layer respectively.

EXAMPLES

Aspects of the present invention are more fully illustrated by the following examples, which are set forth to illustrate certain aspects of the present invention and are not to be construed as limiting thereof.

The following examples are directed towards carbon monoxide (CO) and hydrocarbon (HC) reduction catalysts intended for use in diesel CO and HC abatement applications—the examples provide a method of preparation and illustrate improved performance to reduce CO present in the exhaust gas when used in the exhaust treatment system of the invention.

EXAMPLE 1

Preparation of Pt/Pd Catalyst

Bottom Layer

A commercial high surface area gamma alumina having a BET surface area of approximately 150 m$^2$/g, a pore volume of approximately 0.85 cc/g, and an average pore radius of approximately 100 Å was impregnated with palladium nitrate solution using standard incipient wetness techniques (0.8% Pd based on alumina solids). After subsequent addition of barium hydroxide powder (1.6% BaO based on alumina solids), the resulting mixture was added to a solution of colloidal Pt (1.7% Pt based on alumina solids), a material comprising nanometer sized particles of Pt stabilized with PVP and dispersed in DI water. During the addition, enough barium hydroxide was added to keep the pH above 8. Additional DI water was added to achieve a solids concentration of about 27%. The rheology of the resulting slurry was adjusted by addition of tartaric acid (0.5% based on total slurry solids) and sufficient nitric acid to achieve a pH of 4. Subsequently, the slurry was milled to a particle size 90% less than ca. 20 um using methods known in the art. Sucrose (5% based on total slurry solids) was then added followed by a final pH adjustment to 4 with nitric acid (Slurry A).

A second, alumina-only slurry (Slurry B) was similarly prepared by dispersing the same high surface area gamma alumina in DI water, adjusting the pH of the resulting mixture to 4 using nitric acid, and then milling the mixture to a particle size 90% less than ca. 20 um. Slurries A and B were then combined in a solids ratio of 4.4:1 and thoroughly mixed to ensure uniformity. Prior to coating, the rheology of the slurry was adjusted by addition of a commercial wetting agent (surfactant) and enough nitric acid to reduce the pH to 4. The final slurry was coated onto a 1" diameter by 3" long cordierite substrate using deposition methods known in the art. The coated monolith was dried at 120° C. and calcined at 450° C. in air for 1 h. Total washcoat loading after calcination was approximately 1.3 g/in$^3$. Total platinum group metal loading was 45 g/ft$^3$ with a Pt/Pd weight ratio of 2:1.

Top Layer

The same high surface area gamma alumina used in the bottom layer was impregnated with palladium nitrate solution using standard incipient wetness techniques (5.2% Pd based on alumina solids). After subsequent addition of barium hydroxide powder (10.4% BaO based on alumina solids), the mixture was gradually added to DI water with periodic addition of enough barium hydroxide to keep the pH above 8. After adjusting the pH of the slurry mixture to 4.5 by addition of tartaric acid, barium nitrate (16% BaO based on alumina solids) was added. Additional DI water was added to achieve a solids concentration of about 27%. After addition of sufficient nitric acid to reduce the pH to 4, the slurry was milled to a particle size 90% less than ca. 20 um using methods known in the art. Sucrose (5% based on total slurry solids) was then added followed by a final pH adjustment to 4 with nitric acid (Slurry C).

Slurries A and C were then combined in a solids ratio of 2.2:1 and thoroughly mixed to ensure uniformity. Subsequently, high silica to alumina ratio Beta zeolite obtained from a commercial supplier and additionally spray dried with 10% ceria binder to increase the particle size to a D50 of approximately 22 um was added to the slurry. Prior to coating, the rheology of the slurry was adjusted by addition of a commercial wetting agent (surfactant) and enough nitric acid to reduce the pH to 4. The final slurry was coated onto the 1" diameter by 3" long cordierite substrate previously coated with the bottom layer using deposition methods known in the art. The coated monolith was dried at 120° C. and calcined at 450° C. in air for 1 h. The washcoat loading of the top layer after calcination was approximately 1.4 g/in$^3$ with the spray dried zeolite comprising 0.55 g/m$^3$. The platinum group metal loading in the top layer was 45 g/ft$^3$ with a Pt/Pd weight ratio of 1:2. Total catalyst washcoat loading was 2.7 g/in$^3$ while the total platinum group metal loading was 90 g/ft$^3$ with a Pt/Pd weight ratio of 1:1. This catalyst composite was used as a comparative diesel oxidation catalyst composition.

EXAMPLE 2

Preparation of Pd/CeO$_2$ Catalyst

A commercial high surface area ceria having a BET surface area of approximately 105 m$^2$/g, a pore volume of approximately 0.3 cc/g, and an average pore radius of approximately 50 Å was impregnated with palladium nitrate solution using standard incipient wetness techniques (3.7% Pd based on ceria solids). After subsequent addition of barium hydroxide powder (7.3% BaO based on ceria solids), the mixture was gradually added to DI water with periodic addition of enough barium hydroxide to keep the pH above 8. Subsequently, a commercial high surface area gamma alumina having a BET surface area of approximately 120 m²/g, a pore volume of approximately 0.50 cc/g, and an average pore radius of approximately 60 Å and comprising approximately 4% lanthanum was added to the mixture. This was followed by addition of acetic acid (1.5% based on ceria and alumina solids), barium nitrate (4.2% BaO based on ceria and alumina solids) and tartaric acid (1% based on ceria and alumina solids). Additional DI water was then added to achieve a solids concentration of about 40%. After addition of sufficient nitric acid to reduce the pH to 4, the slurry was milled to a particle size 90% less than ca. 15 um using methods known in the art. The final slurry was coated onto a 1" diameter by 3" long cordierite substrate using deposition methods known in the art. The coated monolith was dried at 120° C. and calcined at 450° C. in air for 1 h. Total washcoat loading after calcination was approximately 1.6 g/in³. Total palladium loading was 40 g/ft³.

EXAMPLE 3

Testing of Catalyst Composites for CO and HC $T_{50}$ Light-Off Temperatures

The coated catalyst composites of Examples 1 and 2 were tested as follows. First, the coated monoliths were cut in half to yield two samples 1.5" in length. The rear 1.5" long portions were then aged in a diesel engine exhaust stream at 750° C. for 25 hours. The temperature of the exhaust steam was raised to 750° C. by combusting injected diesel fuel on an upstream burner DOC. After aging, the coated monoliths were evaluated for light-off (LO) of carbon monoxide and hydrocarbon using a laboratory reactor system capable of passing simulated diesel engine exhaust over a small sample while progressively increasing the temperature. The Pt/Pd formulation was tested separately (comparative composition) and in combination with the Pd/CeO₂ formulation. When the two catalysts were tested together, they were placed adjacently in the reactor with the Pd/CeO₂ formulation in the downstream or rear position. Space velocity was 140,000/h when the Pt/Pd formulation was tested by itself, and 70,000/h for the combination.

The stainless steel reactor used to contain the catalysts at a certain temperature was controlled by pre-heating the reactor gas prior to contact with the catalyst. The inlet temperature was linearly increased at a ramp rate of 15° C./min over the range of 100-310° C. Inlet concentrations of all reactants were established prior to temperature ramping using an MKS FTIR (Model 2030). After the temperature ramp was started, outlet concentrations were continuously monitored by the FTIR, and conversion values were calculated as a function of temperature. Comparative assessment of catalyst performance was accomplished by determining the temperature at which 50% of the CO and HC was converted (CO and HC $T_{50}$ light-off temperature). The catalyst composites were tested first using the following reactant feed composition: CO (500 ppm), propylene (250 ppm $C_1$ basis), decane (150 ppm $C_1$ basis), toluene (150 ppm $C_1$ basis), NO (100 ppm), water (4%), $O_2$ (10%) and balance $N_2$. Subsequent tests were completed by removing the NO from the feed, removing the decane from the feed, and then removing both the NO and decane from the feed gas.

Table 1 summarizes CO and propylene light-off results for the Pt/Pd/alumina and Pd/CeO₂ catalyst composites. Except in the case where both the NO and decane were removed from the feed, CO light-off results for the zoned combination were identical to that of the comparative composite Pt/Pd/alumina tested by itself. Although removal of either NO or decane from the feed resulted in an approximate 6° C. reduction in the light-off temperature of the Pt/Pd/alumina catalyst composite (see entries 3 and 5, Table 1) relative to the standard feed (see entry 1, Table 1), no enhancement in performance was observed by addition of the Pd/CeO₂ catalyst composite in the rear zone (see entries 4 and 6, Table 1). When both NO and decane were removed, no further change in the performance of the comparative Pt/Pd/alumina catalyst composite was observed (see entry 7, Table 1). However, when NO and decane were both removed and Pd/CeO₂ catalyst composite was added to the rear zone, light-off temperature decreased an additional 6° C. from 129° C. to 123° C. (see entry 8, Table 1). The CO and HC oxidation performance of Pd/CeO₂ is inhibited by the presence of NO and high molecular weight hydrocarbons. However, when these are simultaneously removed from the feed stream, the inhibition no longer exists, and the performance of the combination with Pd/CeO₂ in the rear zone is further enhanced relative to the Pt/Pd comparative catalyst by itself. For propylene, a consistent 3-4° C. reduction in light-off temperature was observed under most feed conditions when Pd/CeO₂ was added to the rear zone. The exception was when decane was removed from the feed stream (see entries 5 and 6, Table 1). Nonetheless, when both decane and NO were removed, the performance of the configuration with Pd/CeO₂ in the rear zone was improved by 4° C., similar to that observed for CO (see entries 7 and 8, Table 1).

Hence, only when NO and decane were removed from the feed was the performance of the combination of catalyst composites Pt/Pd/alumina and Pd/CeO₂ higher than that of Pt/Pd/alumina catalyst composite alone.

TABLE 1

Results of catalyst composites tested for CO $T_{50}$ light-off (LO) temperatures

| Entry | Catalyst Formulation | CO $T_{50}$ LO Temperature (° C.) | Propylene $T_{50}$ LO Temperature (° C.) |
|---|---|---|---|
| 1 | Pt/Pd (1:1 @ 90 g/ft³) | 137 | 184 |
| 2 | Pt/Pd (1:1 @ 90 g/ft³) Front Zone and Pd/CeO₂ (40 g/ft³) Rear Zone | 136 | 181 |
| 3 | Pt/Pd (1:1 @ 90 g/ft³) - Without NO | 129 | 161 |
| 4 | Pt/Pd (1:1 @ 90 g/ft³) Front Zone and Pd/CeO₂ (40 g/ft³) Rear Zone - Without NO | 129 | 157 |
| 5 | Pt/Pd (1:1 @ 90 g/ft³) - Without Decane | 130 | 145 |
| 6 | Pt/Pd (1:1 @ 90 g/ft³) Front Zone and Pd/CeO₂ (40 g/ft³) Rear Zone - Without Decane | 131 | 150 |
| 7 | Pt/Pd (1:1 @ 90 g/ft³) - Without NO & Decane | 129 | 132 |
| 8 | Pt/Pd (1:1 @ 90 g/ft³) Front Zone and Pd/CeO₂ (40 g/ft³) Rear Zone - Without NO & Decane | 123 | 128 |

That which is claimed:

1. An exhaust gas treatment system comprising:
a first oxidation catalyst component for the abatement of HC and CO, wherein said first oxidation catalyst component comprises a first catalyst composition disposed onto a carrier substrate, wherein said first catalyst composition comprises a platinum group metal component impregnated into a refractory oxide material;
a selective catalytic reduction (SCR) component for the abatement of NOx, wherein said SCR component comprises a second catalyst composition disposed onto a carrier substrate, wherein said second catalyst composition comprises a metal ion-exchanged molecular sieve;
a second oxidation catalyst component for the abatement of CO, wherein said second oxidation catalyst component comprises a third catalyst composition disposed onto a carrier substrate, wherein said third catalyst composition comprises a platinum group metal component impregnated into an oxygen storage component wherein the platinum group metal component is palladium and the oxygen storage component is ceria; and
wherein the first catalyst component is located downstream of an internal combustion engine, wherein the SCR component is located downstream of the first oxidation catalyst component, and wherein the second oxidation catalyst component is located downstream of the SCR component.

2. The exhaust gas treatment system of claim 1, further comprising a catalyzed soot filter (CSF) component, wherein the CSF component comprises a catalyst composition disposed onto a carrier substrate, wherein said catalyst composition comprises a platinum group metal component impregnated into either a refractory oxide material or an oxygen storage component, and wherein said CSF component is located downstream of the internal combustion engine and upstream of the second oxidation catalyst component.

3. The exhaust gas treatment system of claim 2, wherein the platinum group metal component is palladium, platinum or a combination thereof and the refractory oxide material is alumina.

4. The exhaust gas treatment system of claim 1, further comprising a third oxidation catalyst component, wherein said third oxidation catalyst component comprises a fourth catalyst composition disposed onto a carrier substrate, wherein said fourth catalyst composition comprises a platinum group metal component impregnated into a refractory oxide material, and wherein said third oxidation catalyst component is located upstream of and adjacent to the second oxidation catalyst component.

5. The exhaust gas treatment system of claim 4, wherein the platinum group metal component present in the first and/or fourth catalyst composition is a combination of palladium and platinum in a weight ratio of about 10:1 to about 1:1 with a total platinum group metal loading of at least about 90 g/ft$^3$.

6. The exhaust gas treatment system of claim 5, wherein the refractory oxide material of the first and/or fourth catalyst composition is alumina.

7. The exhaust gas treatment system of claim 1, wherein the first oxidation catalyst component comprises a bottom catalytic coating disposed on the carrier substrate and a top catalytic coating comprising the first catalyst composition disposed on the bottom coating.

8. The exhaust gas treatment system of claim 7, wherein the bottom catalytic coating comprises platinum and palladium impregnated into alumina and the top catalytic coating comprises platinum and palladium impregnated into alumina and zeolite.

9. The exhaust gas treatment system of claim 1, wherein the metal ion-exchanged molecular sieve comprises copper or iron as a promoter metal and at least one additional metal.

10. The exhaust gas treatment system of claim 9, wherein said molecular sieve is an aluminosilicate zeolite with a CHA structure type.

11. The exhaust gas treatment system of claim 1, wherein one or more of the carrier substrates is a honeycomb substrate.

12. The exhaust gas treatment system of claim 11, wherein the honeycomb substrate is a wall flow filter substrate.

13. The exhaust gas treatment system of claim 1, wherein the internal combustion engine is a diesel engine.

14. A method for reducing carbon monoxide present in an exhaust gas stream comprising:
   a. treating exhaust gas exiting internal combustion engine with a first catalyst component and a selective catalytic reduction (SCR) catalyst, wherein the first catalyst component is a first oxidation catalyst, and wherein the SCR catalyst is positioned downstream of the first catalyst component; thereby forming a treated exhaust gas stream with reduced CO, HC and NOx content compared to exhaust stream exiting internal combustion engine; and
   b. treating the treated exhaust gas stream with a second oxidation catalyst component, where CO, HC, and NOx are more reduced compared to treatment with the first catalyst component alone, wherein the second oxidation catalyst component comprises a platinum group metal component impregnated into an oxygen storage component wherein the platinum group metal component is palladium and the oxygen storage component is ceria.

15. The method of claim 14, wherein the first oxidation catalyst comprises a platinum group metal component impregnated into a refractory oxide material.

16. The method of claim 15, wherein the platinum group metal component of the first oxidation catalyst is a combination of palladium and platinum present in a weight ratio of about 10:1 to about 1:1 and the refractory oxide material is alumina.

17. The method of claim 14, wherein the SCR catalyst comprises a metal ion-exchanged molecular sieve comprising copper or iron and has a CHA structure type.

18. The method of claim 14, further comprising treating the treated exhaust gas stream with a third oxidation catalyst to further oxidize CO and HC present in the treated exhaust gas stream, thereby forming a treated exhaust gas stream with a reduced CO, HC and NOx content compared to the treated exhaust gas stream exiting the first oxidation catalyst, wherein the third oxidation catalyst comprises a platinum group metal component impregnated into a refractory oxide support material, and wherein the third oxidation catalyst is located upstream and adjacent to the second oxidation catalyst component.

19. The method of claim 18, wherein the platinum group metal component of the third oxidation catalyst is a combination of palladium and platinum present in a weight ratio of about 10:1 to about 1:1 and wherein the refractory oxide support is alumina.

* * * * *